United States Patent
Li et al.

(10) Patent No.: US 8,199,248 B2
(45) Date of Patent: Jun. 12, 2012

(54) TWO-DIMENSIONAL POLYNOMIAL MODEL FOR DEPTH ESTIMATION BASED ON TWO-PICTURE MATCHING

(75) Inventors: Pingshan Li, Sunnyvale, CA (US); Earl Wong, San Jose, CA (US); Soroj Triteyaprasert, Bangkok (TH)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 657 days.

(21) Appl. No.: 12/363,511

(22) Filed: Jan. 30, 2009

(65) Prior Publication Data

US 2010/0194971 A1 Aug. 5, 2010

(51) Int. Cl.
G03B 13/36 (2006.01)

(52) U.S. Cl. ........................................ 348/353; 396/125

(58) Field of Classification Search .................. 396/125, 396/127; 348/349, 353
See application file for complete search history.

(56) References Cited

U.S. PATENT DOCUMENTS

| | | | |
|---|---|---|---|
| 6,456,737 B1 | 9/2002 | Woodfill et al. | |
| 7,187,413 B2 | 3/2007 | Alderson | |
| 7,880,800 B2 * | 2/2011 | Sasaki et al. | 348/345 |
| 7,941,042 B2 * | 5/2011 | Park et al. | 396/128 |
| 2006/0256229 A1 | 11/2006 | Wernersson | |
| 2007/0014468 A1 | 1/2007 | Gines et al. | |
| 2007/0019883 A1 | 1/2007 | Wong et al. | |
| 2007/0036427 A1 | 2/2007 | Nakamura et al. | |
| 2007/0189750 A1 | 8/2007 | Wong et al. | |
| 2007/0216765 A1 | 9/2007 | Wong et al. | |
| 2007/0297784 A1 | 12/2007 | Wong et al. | |
| 2008/0007626 A1 | 1/2008 | Wernersson | |
| 2008/0080846 A1 | 4/2008 | Grip | |
| 2008/0089598 A1 | 4/2008 | George et al. | |
| 2008/0107411 A1 | 5/2008 | Hope | |
| 2009/0015681 A1 | 1/2009 | Pipkorn | |
| 2009/0079862 A1 * | 3/2009 | Subbotin | 348/345 |

(Continued)

FOREIGN PATENT DOCUMENTS

JP 2002010126 A2 1/2002

(Continued)

OTHER PUBLICATIONS

M. Baba et al. A thin lens based camera model for depth estimation from defocus and translation by zooming. Proceedings of the 15th International Conference on Vision Interface, Calgary, Canada (2002).

(Continued)

*Primary Examiner* — Clayton E Laballe
*Assistant Examiner* — Leon W. Rhodes, Jr.
(74) *Attorney, Agent, or Firm* — John P. O'Banion

(57) ABSTRACT

Apparatus and method for electronically estimating focusing distance between a camera (still and/or video camera) and a subject. Images at different focal positions of a calibration target are collected with distances between subject positions. In one aspect, histogram matching is performed to reduce noise error. A focus matching model is then generated in response to detected blur differences between successive images of the calibration target. The focus matching model is preferably converted to a polynomial equation of a desired order to smooth out image collection noise. The focus matching model is stored for access during operation. In use, the distance to subject is estimated in response to capturing images, detecting blur differences between the images and entering the blur difference information into the matching model.

20 Claims, 10 Drawing Sheets

U.S. PATENT DOCUMENTS

2009/0186655 A1  7/2009  Wernersson
2009/0268985 A1  10/2009  Wong et al.

FOREIGN PATENT DOCUMENTS

WO  2007/022329 A2  2/2007

OTHER PUBLICATIONS

Ziou, D. et al.—"Depth from Defocus Estimation in Spatial Domain"—Computer Vision and Image Understanding, vol. 81, No. 2, Feb. 1, 2001, pp. 143-165.

European Patent Office, Extended European Search Report, EP application No. 10 15 0104—counterpart to U.S. Appl. No. 12/363,511, issued May 20, 2010.

U.S. Appl. No. 12/242,805, filed Sep. 30, 2008—"Fast Camera Auto-Focus".

Yao, Yi et al.—"Auto-focusing in extreme zoom surveillance: a system approach with application to faces"—Advances in Visual Computing, Second International Symposium, ISVC 2006, Lake Tahoe, NV, USA; Nov. 6-8, 2006.

* cited by examiner

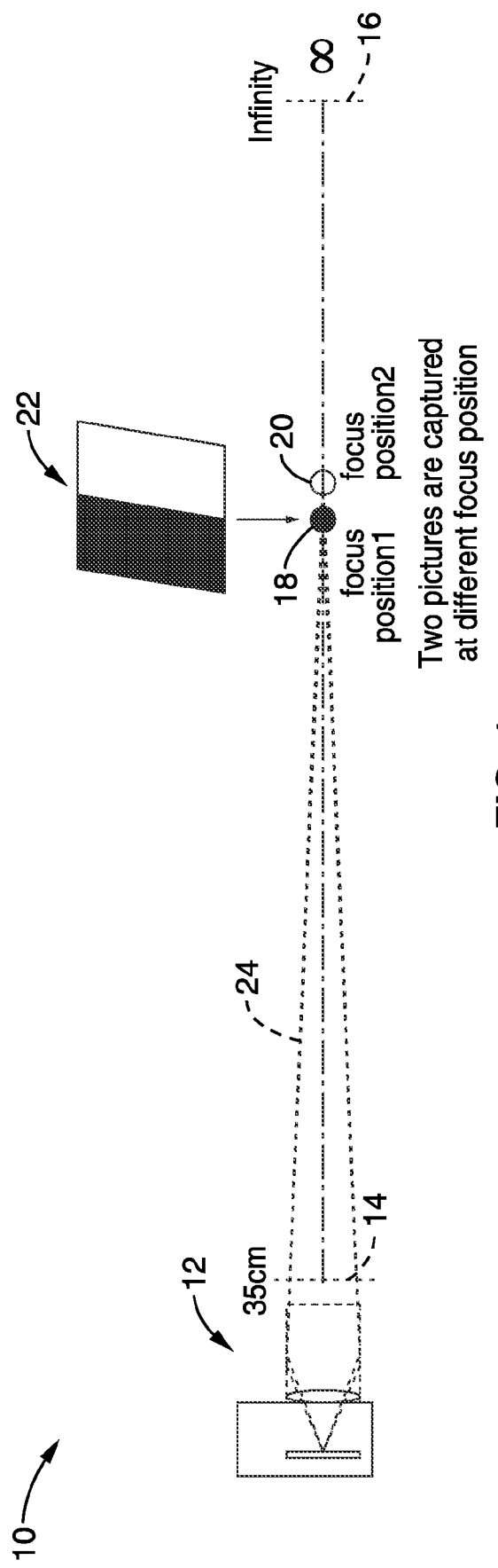
FIG. 1
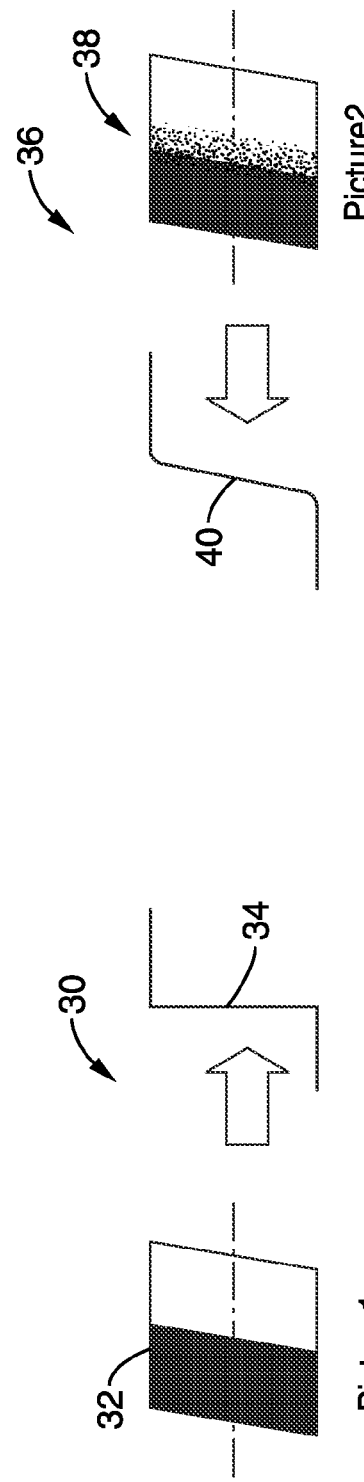
FIG. 2A
FIG. 2B

TWO-DIMENSIONAL POLYNOMIAL MODEL FOR DEPTH ESTIMATION BASED ON TWO-PICTURE MATCHING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image capture, and more particularly to a method and apparatus for camera to subject depth estimation based on two picture matching.

2. Description of Related Art

One critical metric for capturing a desired image is that it be properly focused. Numerous systems have been developed for estimating or attaining a proper camera focus. As a camera-lens system has a number of related elements and characteristics, a brief discussion follows of these elements and their associated characteristics.

Generally, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

One form of typical simple lens (technically a lens having a single element) is that of having a single focal length (also referred to as a "prime lens"). In focusing a camera using a single focal length lens, the distance between lens and the focal plane is changed therein altering the focal point of the photographic subject onto that focal plane. Thus, though the single focal length lens has a fixed optical relation and focal length, it is used in the camera to focus on subjects across a focal range span. Consequently, one should not confuse the fixed focal distance of a lens with the range of focal distance obtainable on a camera using that lens, whereby adjusting the position of that lens in relation to the focal plane alters focal distance.

In using a single focal length lens one would adjust aperture to select the amount of light with respect to desired shutter speed, and then adjust focus according to the subject-distance, which is also referred to as the focal distance and then capture an image. Often a macro setting is provided with a different focal length selection, on an otherwise single focal length lens, for taking close-up shots. A telephoto lens provides a very narrow angle of view with high magnification for filling the frame with images from distance objects.

Multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control.

Regardless of whether a single-focal length lens or multi-focal length lens is utilized, it is necessary to properly focus the lens for a given subject-distance. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there will be a single optimum focus setting for a given distance from camera to the subject (subject-distance). Portions of the subject which are closer or farther than the focal distance of the camera will show up in the captured images subject to some measure of blurring, as depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

Originally, camera focus could only be determined and corrected in response to operator recognition and manual focus adjustments. However, due to the critical nature of focus on results, focusing aids were readily adopted. More recently, imaging devices often provide the ability to automatically focus on the subject, a function which is generically referred to today as "auto focus". Focus continues to be a point of intense technical development as each of the many existing auto focus mechanisms are subject to shortcomings and tradeoffs.

Two general types of auto focus (AF) systems exist, active auto focus and passive auto focus. In active auto focus, one or more image sensors is utilized to determine distance to the focal point, or otherwise detect focus external of the image capture lens system. Active AF systems can perform rapid focusing although they will not typically focus through windows, or in other specific applications, since sound waves and infrared light are reflected by the glass and other surfaces. In passive auto focus systems the characteristics of the viewed image are used to detect and set focus.

The majority of high-end SLR cameras currently use through-the-lens optical AF sensors, which for example, may also be utilized as light meters. The focusing ability of these modern AF systems can often be of higher precision than that achieved manually through an ordinary viewfinder.

One form of passive AF utilizes phase detection, such as by dividing the incoming light through a beam splitter into pairs of images and comparing them on an AF sensor. Two optical prisms capture the light rays coming from the opposite sides of the lens and divert it to the AF sensor, creating a simple rangefinder with a base identical to the diameter of the lens. Focus is determined in response to checking for similar light intensity patterns and phase difference calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing is slower than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary.

Accordingly, a need exists for improved auto focusing techniques which provide rapid and accurate subject-distance estimations and/or focus control under a wide range of conditions. The present invention fulfills that need as well as others and overcomes shortcomings of previous camera focus techniques.

BRIEF SUMMARY OF THE INVENTION

A method of camera depth estimation is described which is based on blur differences and multiple picture matching. This method computes a blur difference between images captured at different focus positions. This blur difference varies depending on lens focus and position in relation to the target image, which according to the present invention can be approximated using a polynomial model of at least two-dimensions. The model is calibrated, such as by using a series of step-edge images, or similarly convenient calibration image mechanism for registering proper focus, and is then utilized for calculating the depth for general images for a given image collection apparatus. The calibration target, or subject, is thus used in a characterization process in which the focusing characteristics, or more aptly expressed as blurring characteristics, of the camera and lens system are determined and modeled for use during camera operations.

The discussion herein is directed primarily to a camera having a single focal length lens, however, the technique is applicable to multi-focal length lenses (e.g., "zoom" lenses) as will be discussed near the end of the specification. It will be appreciated that in addition to auto focusing, the depth estimation taught herein has many applications in areas including computer/robotic vision, surveillance, 3D imaging, and similar imaging systems.

According to a general description of the invention, matching curves are obtained for calibration images (e.g., step-edge images) at different distances across the whole focusing range, or a desired portion thereof. Then a multi-dimensional (e.g., two-dimensional) model is created, preferably a polynomial model, to represent the matching curves. The two-dimensional polynomial model can then be used for depth estimation when blur differences are computed on general images for the given apparatus.

The following terms are generally described in relation to the specification, and are not to be interpreted toward constraining specific recitations of the specification.

The term "histogram" is a statistical term describing a graphical display of tabulated frequencies, and generally shows proportionally the number of cases falling into each of several categories, whether discrete in bars or across a range.

The term "polynomial" as applied for modeling a matching curve is a polynomial function, such as having the general one dimensional form:

$$y=a_n x^n + a_{n-1} x^{n-1} + \ldots + a_2 x^2 + a_1 x^1 + a_0$$

in which n is a non-negative integer that defines the degree of the polynomial. It will be noted that a polynomial with a degree of 3 is a cubic, 2 is a quadratic, 1 is a line and 0 is a constant. Polynomial equations can be used for modeling a wide range of empirically determined relationships.

The term "convolution" as used herein describes a mathematical operation on two functions to produce a third function that is typically viewed as a modified version of one of the original functions. Often the second function is reversed and overlays a portion of the first function, toward more properly modeling a given data set.

The term "point spread function" (PSF) describes the response of an imaging system to a point source or point object, this is often also referred to as an impulse response, such as found across a step edge. In this context, the degree of spreading (blurring) of the point object is a measure for the focal quality of the imaging system.

The term "outlier" is a statistical term indicating that one or more observations in the empirical data set are numerically distinct or separate from the remainder of the data set. Outlier points may indicate systemic shortcomings, faulty data, and so forth, although a small number of outliers are expected in any large sample sets. Attempting to model the data set including the "outliers" could lead to a misleading model, wherein they are typically discarded once it is assured they do not properly represent the characteristics of the underlying function.

The invention is amenable to being embodied in a number of ways, including but not limited to the following descriptions.

One embodiment of the invention is an apparatus for electronically capturing images, comprising: (a) an imaging device (e.g., one or more charge-coupled device (CCD), complementary metal-oxide semiconductor (CMOS) imaging element, or the like); (b) a focus control element coupled to the imaging device; (c) a computer processor coupled to the imaging device and focus control element; and (d) at least one memory configured for retaining images captured from the imaging device, adapted for retaining programming executable on the computer; (e) at least one multi-dimensional focus matching model obtained for the apparatus in response to imaging calibration targets at different focal lengths and retained in said memory; and (f) programming executable on the computer for capturing multiple object images and automatically adjusting the focus control element of the apparatus in response to performing depth estimation on object images based on inputting blur differences detected between object images into the multi-dimensional focus matching model. It should be appreciated that the apparatus comprises at least one still, video, or still and video image capturing device. It should also be appreciated that calibration is preferably performed using a computer, wherein polynomial coefficients can be calculated by the computer for storage in a given camera, or a given embodiment of cameras. In a preferred embodiment, the depth estimation and focus control are then implemented in the camera.

In one mode of the invention, the model of focus matching (e.g., multi-dimensional focus matching model) is cast into a polynomial function modeling the focus matching curves as obtained in response to the imaging of calibration targets in the focal range of the camera. It should be noted that the focus matching model is determined for a given embodiment of imaging device (e.g., model, type, or configuration) of the camera apparatus (and/or lensing system) and information representing the model is stored within at least one memory whose contents can be retrieved by a computer processor element within the camera.

In one mode of the invention, histogram matching is performed prior to calculating blur difference. Histogram matching involves equalization wherein pixels of closest luminance are shifted between histograms in response to minimizing error between the pictures captured at the different subject distances. This process is then approximated by a linear histogram matching function.

One embodiment of the invention is an apparatus for estimating focusing distance from a camera (objective) to a subject, comprising: (a) a computer integrated with or configured for connection to an imaging device of a camera (e.g., a computational element within a camera device); (b) at least one memory configured for retaining captured images, and retaining programming executable on the computer; (c) at least one multi-dimensional focus matching model obtained for the apparatus in response to imaging calibration targets at different focal lengths, said multi-dimensional focus matching model retained in said memory; (d) programming executable on said computer for automatically estimating proper focal distance (e.g., auto focus) in response to performing depth estimation in response to, (i) capturing multiple object images, (ii) determining blur differences between said multiple object images, and (iii) entering said blur differences into said multi-dimensional focus matching model to generate an estimate of focal distance to the subject. It should be appreciated that the apparatus is configured for incorporation within a still camera, video camera, or combination still and video camera device. The focus matching model above can be created and used for a single focal length lens, or additional data taken across the range of magnifications when utilizing a multi-focal length (zoom) lens system.

In one aspect of the invention the two-dimensional model of focus matching curves is based on blur differences determined in response to contrast changes as camera to calibration subject-distance is ranged through at least a portion of, or more preferably all of, the focusing range of the camera and/or lensing system. Accordingly, the focus setting at which images are captured and the amount of blur difference detected between these images is utilized to estimate the actual subject distance, or depth of the subject from the camera. In one mode of the invention, the two-dimensional model of focus matching curves is generated, comprising: (i) modeling blur change as a point spread function from a first to a second position; (ii) evaluating blur changes at intermediate positions between first and second positions and determining which image is sharper; and (iii) generating a model of focus matching in response to the steps (i) and (ii) performed as a sequence of images is collected across at least a desired portion of the focal range of the camera, or preferably the whole focal range, from which blur difference between images is incorporated into the focus matching model.

In one mode of the invention, a histogram matching process is performed for removing, or diminishing, the mismatching which arises between successive focal positions in response to physical camera and environmental variation (e.g., lighting variations, shutter timing variation, positioning fluctuation, and so forth), so that distance can be more accurately determined based on blur. It will be appreciated that the histogram matching process can be performed on the images of the calibration targets when originally generating the focus matching model and also in the camera device on the images captured for use in the focus matching model as a step prior to determining blur differences.

In at least one preferred embodiment, the focus matching model is cast into a polynomial function which smoothes the curves between focal positions toward reducing mismatching noise. The polynomial is preferably selected based on the desired image application and the nature of the lens and camera system in use. By way of example, and not limitation, the polynomial function may be a bi-quadratic function, a bi-cubic function, and so forth.

One embodiment of the invention is a method of automatic camera estimation of subject focal depth, comprising: (a) storing a model of multi-dimensional focus matching in response to detecting blur differences between multiple images of a calibration subject captured at different focal distances; (b) capturing multiple object images; (c) determining blur differences between the multiple object images; and (d) estimating focal depth in response to entering the blur differences between multiple object images into the multi-dimensional focus matching model to generate an estimate of focal distance to the subject. The method may be incorporated within any form of frame-capture capable imaging system, such as within a still camera, a video camera, or a combination still and video camera.

In one aspect of the invention, the blur differences between captured images are determined in response to determining contrast difference changes of a known calibration target (e.g., a particular fixed slate or graphic) as the distance between calibration subject and the camera changes. The focal distance at which images are captured and the amount of blur difference between these images is utilized through the model of focus matching to estimate the actual subject distance, or depth.

One embodiment of the invention is a computer-readable media containing a computer program executable on a computer (e.g., integrated within a camera device) which is configured for automatically estimating camera focal depth of a subject, in response to steps, comprising: (a) storing a focus matching model created in response to blur difference information generated about a calibration subject at different focal distances; (b) capturing images for at least two different focal positions; (c) calculating blur difference between captured images; and (d) estimating depth of the subject in response to inputting the blur difference between captured images into the focus matching model and solving the model to generate an estimation of distance to subject. More particularly, it will be appreciated that the model is utilized for solving the inputs to arrive at an estimation of distance to subject. It will be appreciated, therefore, that the invention may be constituted as an imaging apparatus (e.g., electronic still and/or video camera), control apparatus for an imaging device, or a method for estimating subject-distance within an imaging system, such as one which preferably contains a computer processing element and memory for retaining programming executable on the computer.

The present invention provides a number of beneficial aspects which can be implemented either separately or in any desired combination without departing from the present teachings.

An aspect of the invention is a method for estimating distance to a subject (subject-distance, or camera focal distance) in response to capturing and matching multiple images during characterization of the camera-lens system at multiple focal points.

Another aspect of the invention is the use of distance estimation to estimate focus, or to control focus adjustments, within a camera system.

Another aspect of the invention is a subject-distance estimation method which can estimate distance in response to the input of at least images representing at least two focal settings taken of an image at a given subject-distance.

Another aspect of the invention is a subject-distance estimation method which characterizes blur difference for a given apparatus, and then uses this characterization for estimating subject-distance when at least two images are provided exhibiting distinct levels of blurring for a given subject-distance.

Another aspect of the invention is a subject-distance estimation method which only requires the use of two image inputs for estimating a subject-distance, although additional inputs can be utilized for increasing estimation accuracy as desired, or for successive and/or continuous estimations.

Another aspect of the invention is a subject-distance estimation method in which multiple images with different focal settings are captured of an image having a fixed subject-distance, and blur information from these images is plugged into the focus matching model which is solved for distance to generate an estimate of the actual subject-distance.

Another aspect of the invention is a subject-distance estimating method or apparatus which adopts a polynomial model to represent the empirical focus matching model.

Another aspect of the invention is a histogram matching method in which pixels are sequentially shifted from one histogram to the other to equalize the pixels of closest luminance in the other histogram to reduce the effects of noise introduced into the model in response to undesired physical and environmental variations, and is approximated by a linear matching function.

Another aspect of the invention is a subject-distance estimation apparatus and method which can be utilized for single focal point lenses, discrete focal point lenses (e.g., normal and macro settings), or continuously variable focal point lenses (e.g., zoom lenses).

Another aspect of the invention is a distance estimation apparatus and method in which a focus matching model can be generated for each discrete magnification setting of a camera, or at incremental positions along a continuously variable magnification (zoom) range.

A still further aspect of the invention is that depth estimation and focus can be determined for a wide range of imaging apparatus (e.g., still and/or video camera devices) configured for capturing images at different focus and zoom settings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focal points according to an aspect of the present invention.

FIG. 2A-2B are comparisons of calibration target (e.g., step edge) images according to an aspect of the present invention.

DETAILED DESCRIPTION OF THE INVENTION

Figure 3:
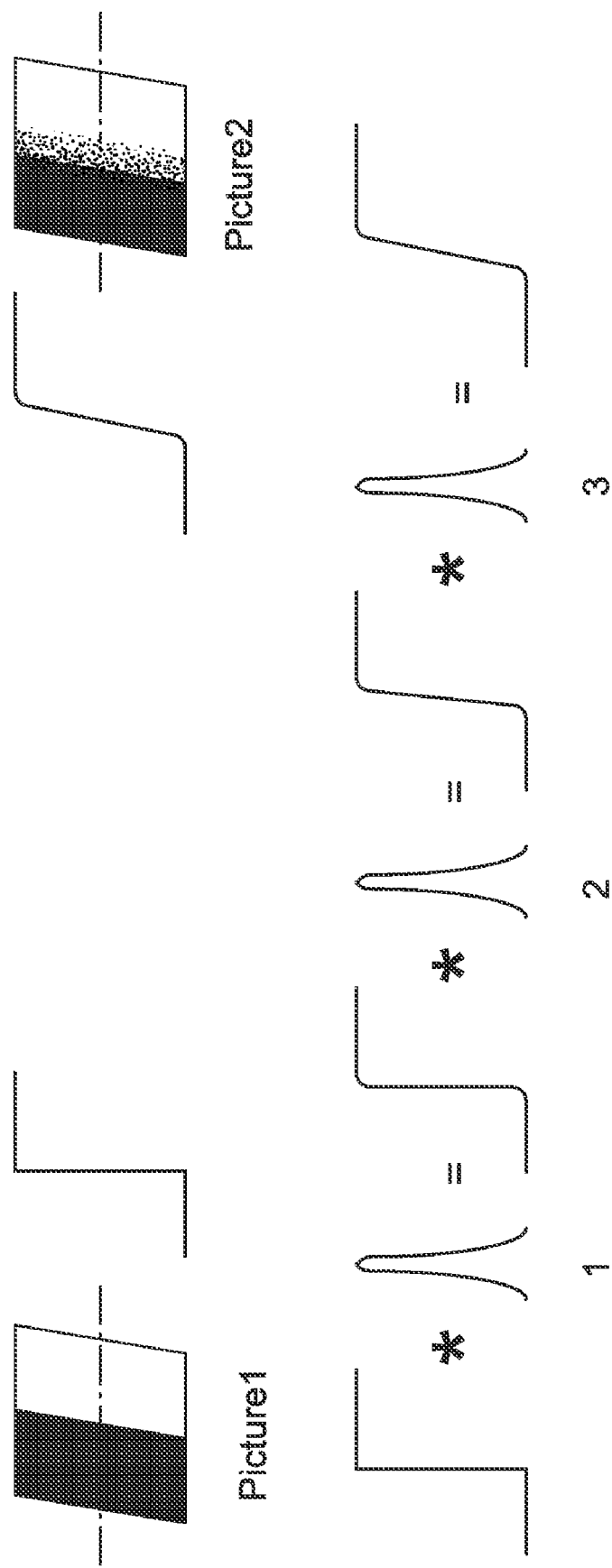
FIG. 3 is a schematic of computing blur difference in three iterations according to an aspect of the present invention.

Referring more specifically to the drawings, for illustrative purposes the present invention is embodied in the apparatus generally shown in FIG. 1 through FIG. 14. It will be appreciated that the apparatus may vary as to configuration and as to details of the parts, and that the method may vary as to the specific steps and sequence, without departing from the basic concepts as disclosed herein.

1. Blur Difference.

FIG. 1 illustrates an embodiment 10 in which multiple images are captured of a calibration target (or calibration subject), at different focal positions (subject-distances) when collecting a data set for a given imaging apparatus (e.g., specific embodiment, make or model of camera, or a family of cameras using the same/similar optical imaging elements). Collecting the data set comprises a characterization process for the camera-lens system at a given magnification setting (lens at a fixed focal length, zoom setting). An imaging device (camera) 12 is shown which can focus from a minimum focal length 14 on out to infinity 16. Minimum focal distance 14 (e.g., in this case 35 cm) is shown as well as focus at infinity 16. According to the invention, the focus converges to first focal position 18 and then to a second focal position 20, upon a calibration target 22, such as step-edge image, slate, graticule, or similar target having known optical characteristics, along focal path 24.

By way of example and not limitation, a Sony DSC-R1 camera was used herein to illustrate the inventive method, although one of ordinary skill in the art will appreciate the method can be utilized with other digital still and/or video cameras. The focusing distance of this camera ranges between the minimal focus distance (e.g., 35 cm for Sony DSC-R1) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth.

Suppose two pictures $f_A$ and $f_B$ are taken at positions A and B, with $f_A$ being sharper than $f_B$. The blur change can be modeled by a point spread function P given as:

$$f_A * P = f_B$$

where * denotes two dimensional convolution. In addition, the point spread function P can be approximated by using a series of convolutions by a blur kernel K.

$$P = K * K * \ldots * K \qquad (1)$$

For one test case, kernel K was chosen to be $$K = \frac{1}{48}\begin{pmatrix} 1 & 4 & 1 \\ 4 & 28 & 4 \\ 1 & 4 & 1 \end{pmatrix}. \qquad (2)$$

According to this, the amount of blur difference between $f_A$ and $f_B$ can be measured by the number of convolutions in Eq. 1. In actual implementation, the blur difference is more preferably obtained utilizing an iteration process.

FIG. 3 illustrates an iteration process, herein exemplified with three iterations performed between picture $f_A$ (left) and picture $f_B$ (right).

Figure 4:
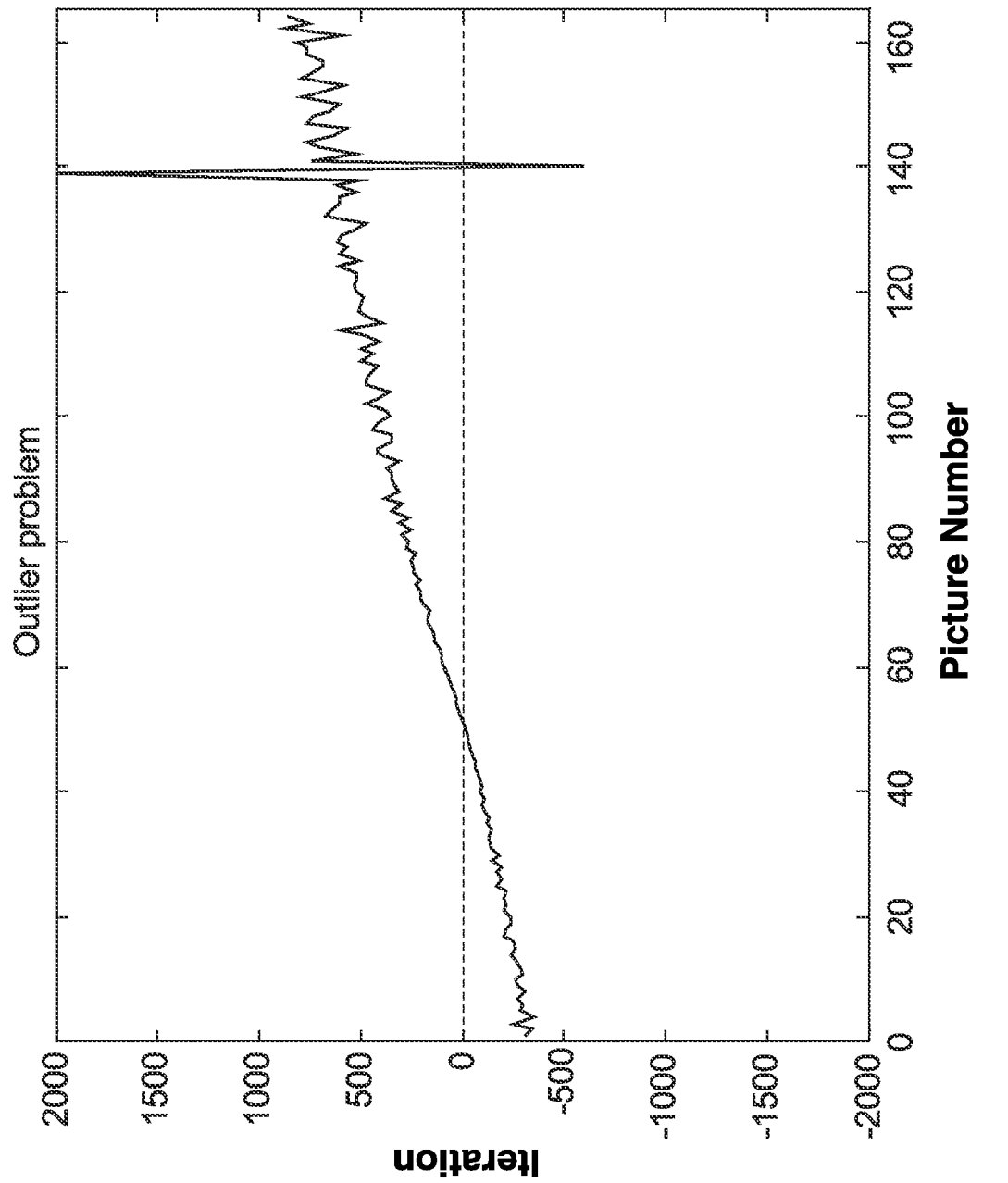
FIG. 4 is a graph of a matching curve collected according to an aspect of the present invention and showing the inclusion of outliers and noise.

FIG. 4 depicts a matching curve obtained for an image of a step-edge placed at a fixed distance (e.g., 100 cm). A first picture of the sequence is taken at the focus distance of infinity, then one picture is taken every time the lens is moved to focus at one depth of field closer, until the focus distance reaches the minimal focus distance. This sequence of pictures is denoted by $f_0, f_1, \ldots, f_{N-1}$, where N is the length of the sequence. In practice, to ensure the sequence covers the whole focus range, $f_0$ preferably starts at the distance slightly further than infinity, and $f_{N-1}$ is slightly closer than the specified minimal focus distance. These results were achieved using the DSC-R1 camera configured with software for controlling camera steps and sequences.

For a given focal depth, in order to find the relationship between the iteration number and the focus position, a sequence of pictures is taken for the whole focal range of the camera from which the blur difference between every two pictures can be calculated.

It should be appreciated what is meant by the iterations and in particular negative iteration numbers, as will be seen represented in certain figures (e.g., FIG. 4). Positive iteration numbers indicate that $f_i$ is sharper than $f_{i+1}$. The absolute value of the iteration number is calculated by using the equation $$\mathrm{argmin}_l \left\| f_i * \underbrace{K * K * \ldots * K}_{l \text{ convolutions}} - f_{i+1} \right\|_2.$$

Otherwise, if the iteration number is negative, this indicates that $f_{i+1}$ is sharper than $f_i$. In this case the absolute value of the iteration number is given by $$\mathrm{argmin}_l \left\| f_{i+1} * \underbrace{K * K * \ldots * K}_{l \text{ convolutions}} - f_i \right\|_2.$$

It will be noted that $\|\cdot\|_2$ denoted $L_2$ norm. It should also be recognized that other methods of error measuring may be utilized without departing from the present invention. However, it should be noted that when the two pictures are taken, it is unknown a priori which one of $f_i$ or $f_{i+1}$ is sharper. Accordingly the method is configured to compute both Eqs. 3 and 4 below.

$$I_1 = \mathrm{argmin}_l \left\| f_i * \underbrace{K * K * \ldots * K}_{l \text{ convolutions}} - f_{i+1} \right\|_2 \qquad (3)$$

$$I_2 = \mathrm{argmin}_l \left\| f_{i+1} * \underbrace{K * K * \ldots * K}_{l \text{ convolutions}} - f_i \right\|_2 \qquad (4)$$

If $I_1$ is larger than $I_2$, then $f_i$ is sharper than $f_{i+1}$, wherein the value of iteration number (as in FIG. 4) will be $I_1$. Otherwise if $I_2$ is larger than $I_1$, then $f_{i+1}$ is sharper than $f_i$, and the value of iteration number (e.g., as in FIG. 4) will be $-I_2$. If $I_1$ and $I_2$ are equal, then we compare the errors:

$$e_1 = \left\| f_i * \underbrace{K * K * \ldots * K}_{I_1 \text{ convolutions}} - f_{i+1} \right\|_2 ; \text{ and}$$

$$e_2 = \left\| f_{i+1} * \underbrace{K * K * \ldots * K}_{I_2 \text{ convolutions}} - f_i \right\|_2.$$

If $e_1$ is smaller than $e_2$, then $f_i$ is sharper than $f_{i+1}$; otherwise $e_2$ is smaller wherein $f_{i+1}$ is sharper than $f_i$.

The relationship between iteration number and focal positions for the depth of 100 cm is shown in FIG. 4. The blur difference between every two pictures $f_i$ and $f_{i+1}$ for $i = 0, \ldots, N-2$ is calculated. The "picture number" axis indicates the image pairs for which the iteration number is calculated. For example, picture number 0 means that the iteration number is calculated between $f_0$ and $f_1$. It can be seen that the absolute value of the number of iterations increases when the lens focus position moves away from the subject distance. The zero-crossing point is where the subject is in focus.

Figure 6:
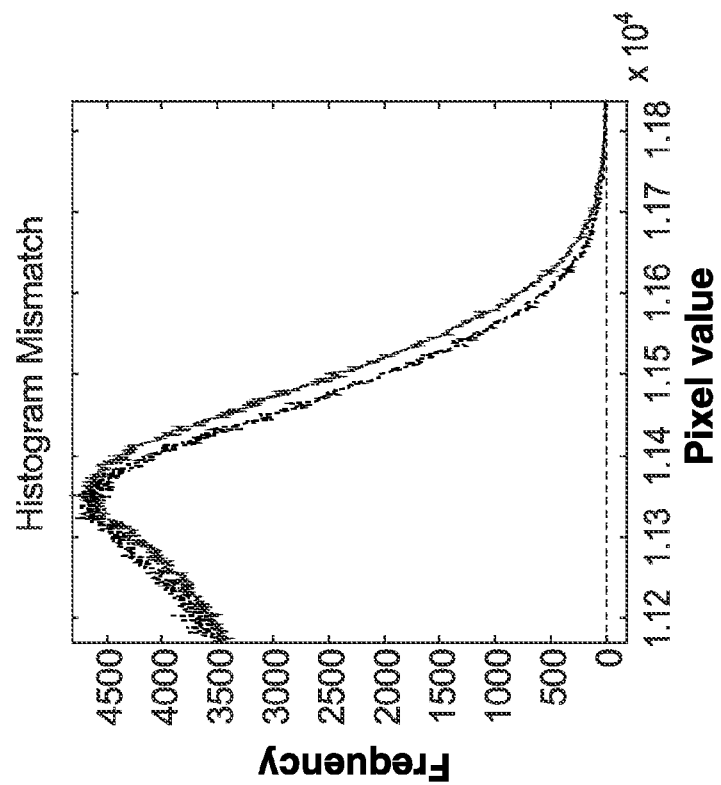
FIG. 6 is a magnified histogram showing a portion of the histogram depicted in FIG. 5.
Figure 5:
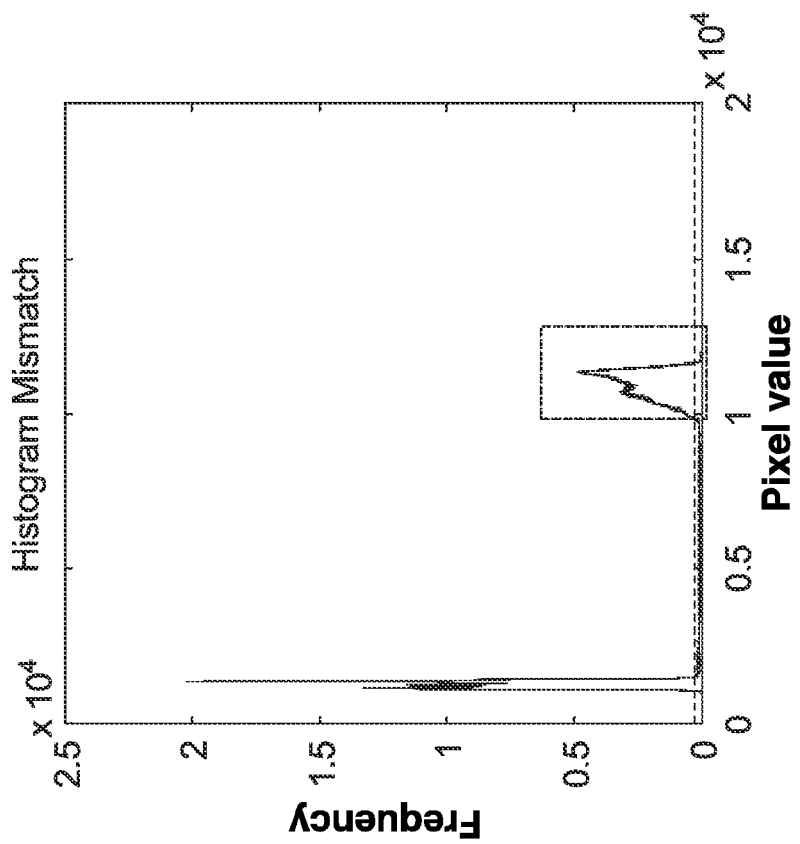
FIG. 5 is a histogram of mismatching between successive subject-distances according to an aspect of the present invention.

FIG. 5 and FIG. 6 compares the histograms for pictures 138 and 139 from FIG. 4, wherein significant mismatching is noted. It will be appreciated that this mismatching should be removed before subject-distance can be accurately computed based on blur.

2. Histogram Matching.

To correct for the mismatching, a matching procedure is preferably performed by modifying one histogram to match the other one. It will be appreciated that a simple linear matching function can be utilized, although other functions can be utilized. Pixels are sequentially shifted from one histogram to equalize the number of pixels of the closest luminance of the other histogram. In response to the shifting of pixels between two histograms, the matching function is determined, such as using a least squared error solution. Afterwards the histogram matching function is applied to the two pictures before the focusing matching is performed.

Figure 7:
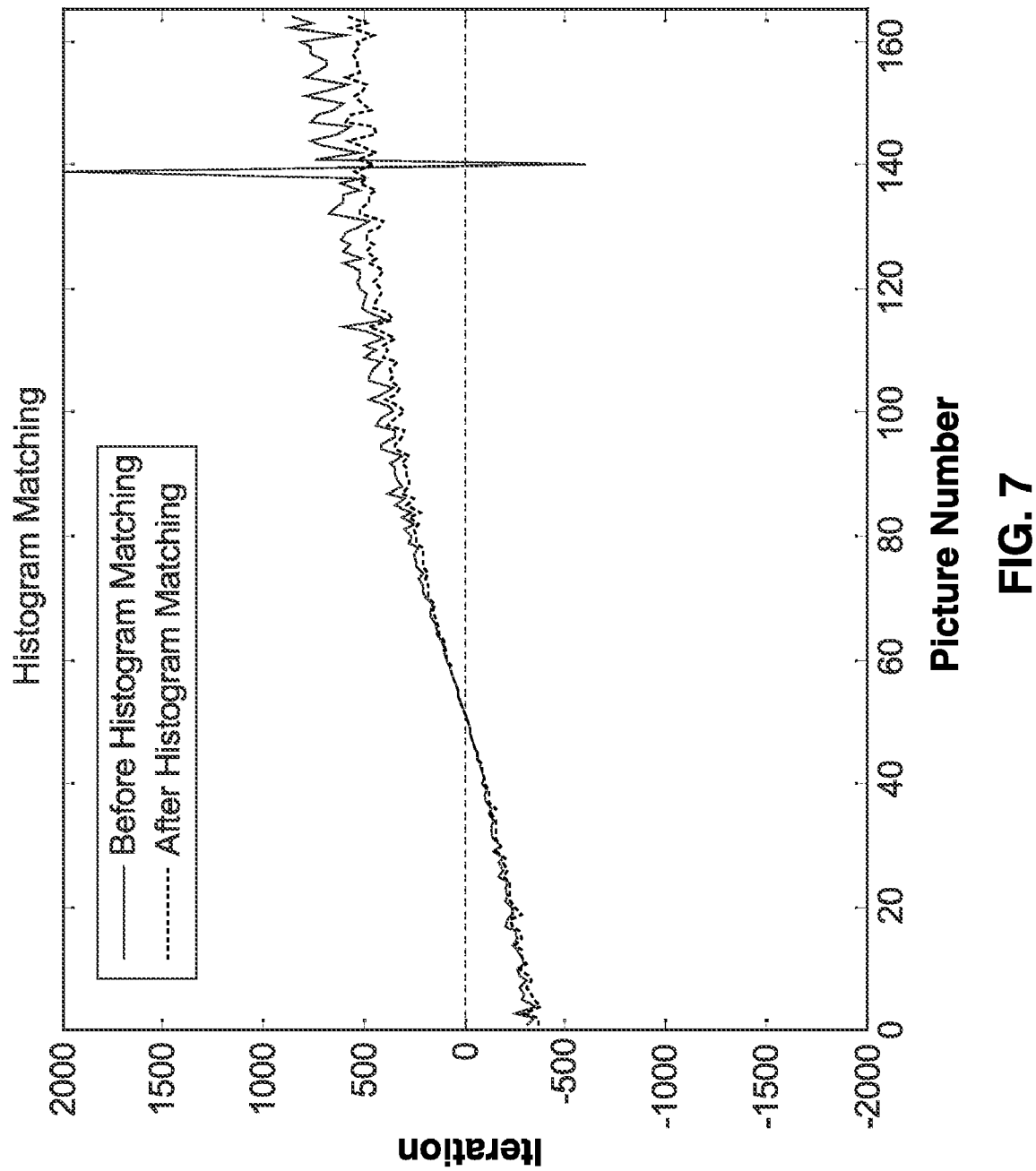
FIG. 7 is a graph of a matching curve showing matching before and after histogram matching according to the present invention.
Figure 8:
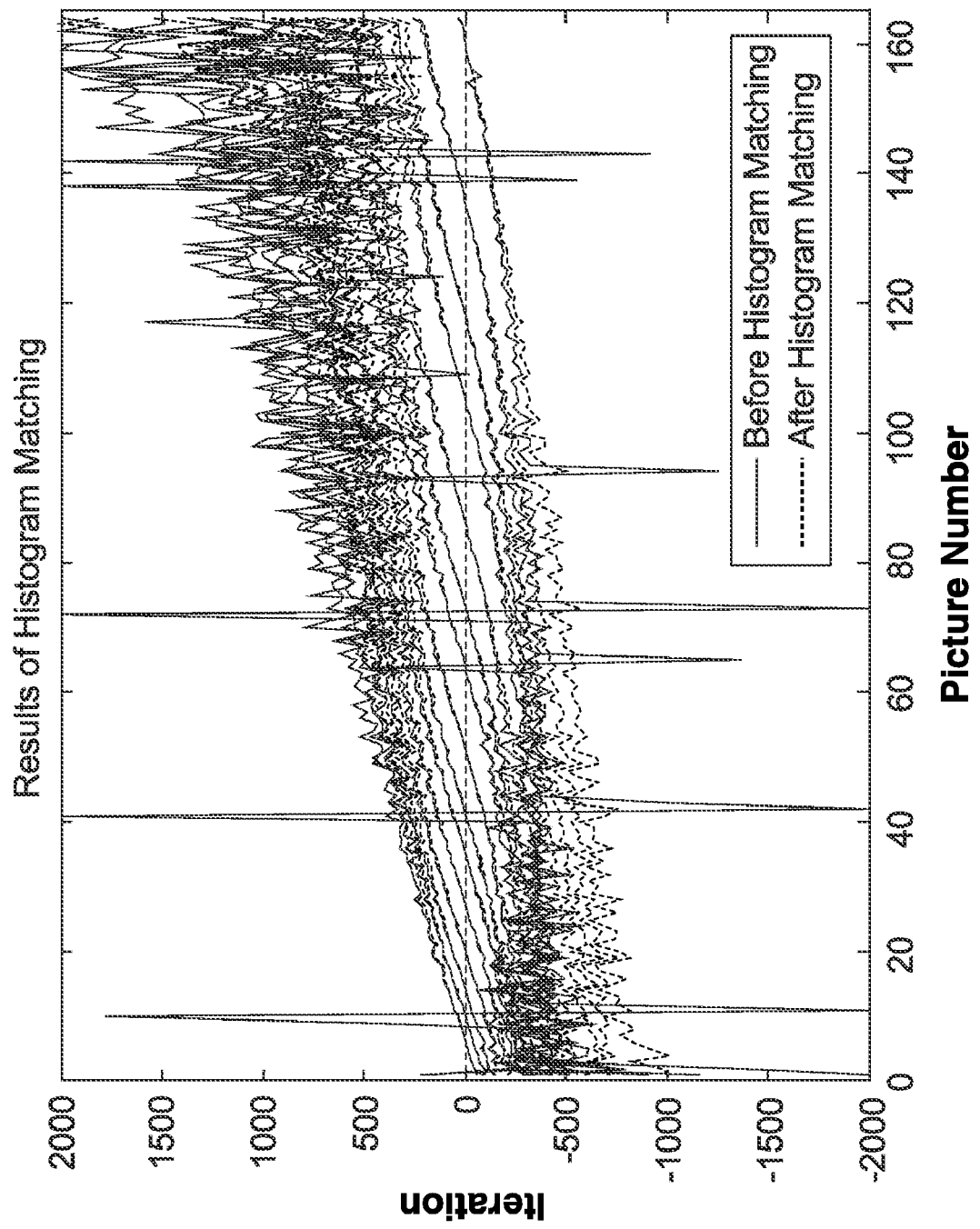
FIG. 8 is a graph of a matching curve across fifteen showing matching before and after histogram matching according to an aspect of the present invention.

FIG. 7 and FIG. 8 depict iteration curves for different subject depths without histogram matching being applied before focus matching as shown in the solid lines, and with histogram matching as shown in the dashed lines. FIG. 7 depicts a single example while FIG. 8 depicts the iteration curves for fifteen different distances. The plots for FIG. 8 were generated by placing a step-edge at distances of infinity, 1000, 500, 300, 200, 150, 125, 100, 80, 70, 60, 50, 45, 40 and 35 cm, respectively. The iteration number I can be written as a function F of focus distance L and subject depth D.

$$I = F(L, D), \quad (5)$$

where L and D are both measured by picture number, which physically means the number of depths of field measured from infinity, or from where picture 0 is defined. Depth estimation is a process to determine D given I and L. On the data shown in FIG. 8, Eq. 5 is used to model depth estimation.

The data shown in FIG. 4, FIG. 7 and FIG. 8 manifest significant signal noise. For instance, in FIG. 4-6, noticeable outliers are seen at picture number 139. The source of these outliers may include changes of lighting conditions and aperture variations during the capturing process, as well as other physical camera and environmental variations.

It will be appreciated that in view of the mismatching seen in these figures, the histogram matching technique is applied to the images before the blur difference is calculated. Let $h_1$ and $h_2$ denote the histograms of two different images $f_1$ and $f_2$, respectively. Consider $h_1$ as the reference histogram and $h_2$ as the histogram to be modified to match $h_1$, wherein the following steps are performed.

(1) A pixel mapping matrix w(i,j) is generated.

(2) Setting w(i,j)=0 for every i and j ranging from 0 to the maximum gray level M.

(3) Find the smallest i that satisfies $h_1(i)>0$, and find the smallest j that satisfies $h_2(j)>0$.

(4) If $h_2(j) \geq h_1(i)$, set w(i,j)=$h_1(i)$, update $h_2(j)$ by $h_2(j) \leftarrow h_2(j) - h_1(i)$, and set $h_1(i)=0$.

Else If $h_2(j) < h_1(i)$, set w(i,j)=$h_2(j)$, update $h_1(i)$ by $h_1(i) \leftarrow h_1(i) - h_2(j)$, and set $h_2(j)=0$.

Steps 3 and 4 are then repeated until both $h_1$ and $h_2$ become 0 for all gray levels, which arises in response to the two pictures having the same number of pixels.

After the mapping matrix w(i,j) is created, a linear matching function H(x)=ax+b is constructed, such as using a weighted least squares regression method, where a and b are computed as follows:

$$b = \frac{\sum_{i=0}^{M}\sum_{j=0}^{M} w(i,j) \sum_{i=0}^{M}\sum_{j=0}^{M} [w(i,j)ij] - \sum_{i=0}^{M}\sum_{j=0}^{M} [w(i,j)i] \sum_{i=0}^{M}\sum_{j=0}^{M} [w(i,j)j]}{\sum_{i=0}^{M}\sum_{j=0}^{M} w(i,j) \sum_{i=0}^{M}\sum_{j=0}^{M} [w(i,j)j^2] - \left(\sum_{i=0}^{M}\sum_{j=0}^{M} w(i,j)j\right)^2} \quad (6)$$

$$a = \frac{\sum_{i=0}^{M}\sum_{j=0}^{M} [w(i,j)i] - b \sum_{i=0}^{M}\sum_{j=0}^{M} [w(i,j)j]}{\sum_{i=0}^{M}\sum_{j=0}^{M} w(i,j)} \quad (7)$$

Matrix w(i,j) is generally sparse. In one mode of the method only the non-zero values and their locations are stored to improve memory and computational efficiency.

The histogram matching function H(x) is applied to each pixel of $f_2$ before performing blur matching of the two images. The result of the histogram matching is shown in FIG. 8.

It should be appreciated that the main purpose of histogram matching is to remove outliers. Even after the matching procedure has been performed it can be seen that the matching curves still exhibit significant noise. Accordingly, after matching is performed the curves are modeled according to a polynomial model.

3. Two Dimensional Polynomial Model.

The matching curves described above can be approximated using a multi-dimensional polynomial function, such as a two-dimensional (2-D) polynomial function, to facilitate calculations while removing a large portion of the mismatching noise seen in FIG. 4 through FIG. 8.

In this model the iteration number is a function of lens position and object distance. The coefficients are determined, for example in response to using a least squared error two-dimensional polynomial fitting algorithm. A two-dimensional polynomial is used to model the blur iteration function of Eq. 5.

$$I = \sum_{i=0}^{m}\sum_{j=0}^{n} C(i,j) L^i D^j \quad (8)$$

The coefficients C(i,j) are determined using the method described in T. B. Deng in "*Linear Approach to the Least-Square Multidimensional Polynomial Fitting*", Proc. IEEE International Conference on Information, Communication and Signal Processing, Singapore, September 1997.

The degree of the polynomial, m and n, are chosen depending on the use of specific lenses and applications. Examples of bi-quadratic (m=n=2) and bi-cubic (m=n=3) polynomials are shown in the figures.

By way of a first example, bi-quadratic function coefficients can be used to approximate the fitting algorithm. By way of example and not limitation, for a bi-quadratic approximation the curves can be represented by a 3×3 matrix, such as the following.

$$C(i, j) = \begin{matrix} -5.268385e+00 & 1.014786e+01 & -3.073324e-02 \\ -9.677197e+00 & -1.522669e-02 & 3.695552e-04 \\ 3.325387e-02 & -2.438326e-04 & -3.833738e-07 \end{matrix}$$

Figure 9:
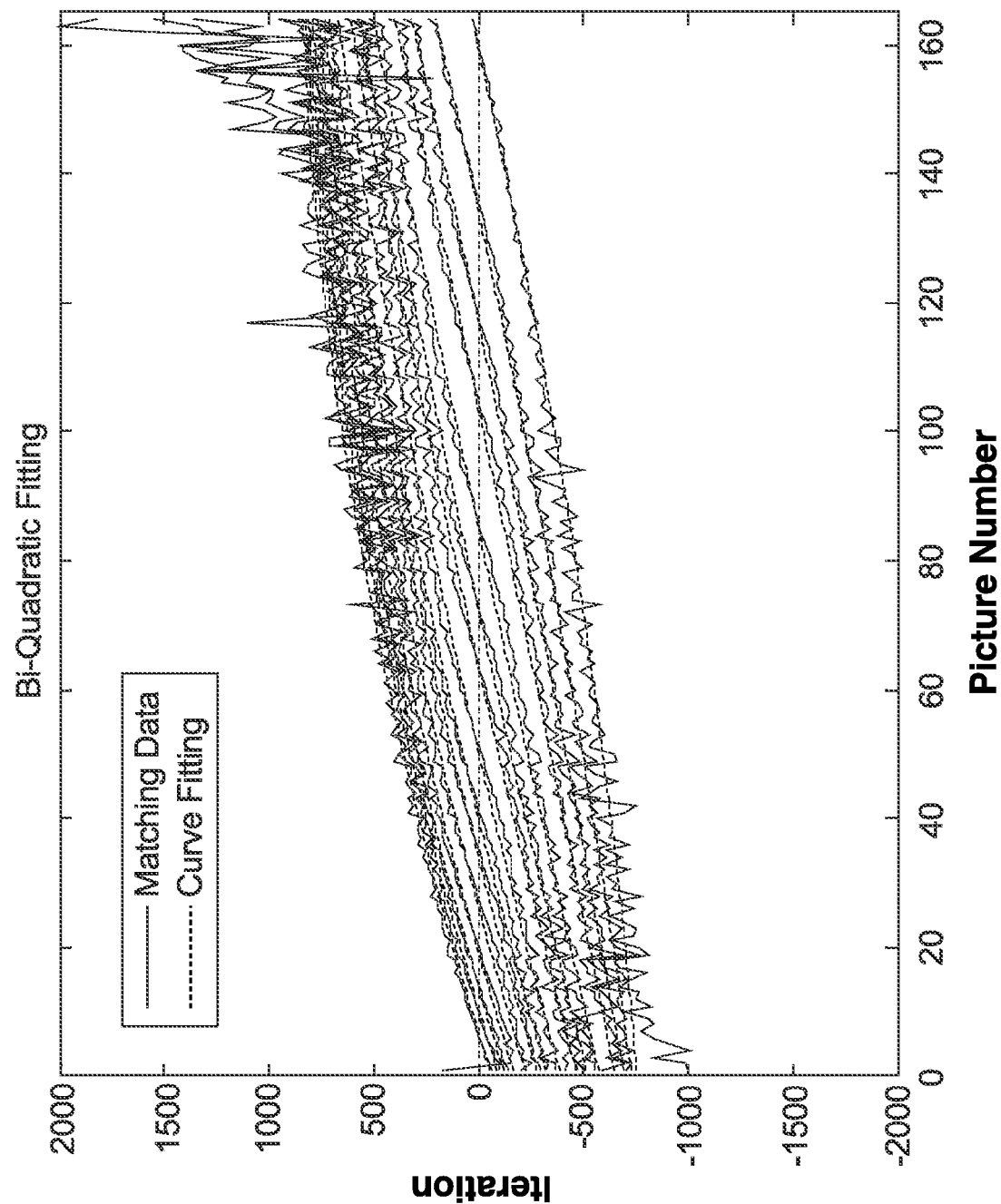
FIG. 9 is a graph of a matching curve showing the use of bi-quadratic fitting according to an aspect of the present invention.

FIG. 9 is a bi-quadratic fitting curve shown in the dashed lines in comparison with the matching data shown in solid lines. The smooth lines of bi-quadratic curve fitting are in stark contrast to the more jagged lines for the empirically collected matching data. It will be seen that the polynomial provides a sufficient match with the matching data shown by the solid lines.

By way of a second example, bi-cubic function coefficients can be alternately utilized to approximate the fitting algorithm. By way of example and not limitation, for a bi-cubic approximation the curves can be represented by a 4×4 matrix, such as the following.

$$C(i, j) = \begin{matrix} -2.096603e+01 & 1.414987e+01 & -1.356138e-01 & 5.802068e-04 \\ -1.074841e+01 & -1.387527e-01 & 4.771262e-03 & -2.600512e-05 \\ 8.499311e-02 & -4.243161e-04 & -3.456327e-05 & 2.485215e-07 \\ -3.199641e-04 & 6.471844e-06 & 5.348240e-08 & -6.416592e-10 \end{matrix}$$

Figure 10:
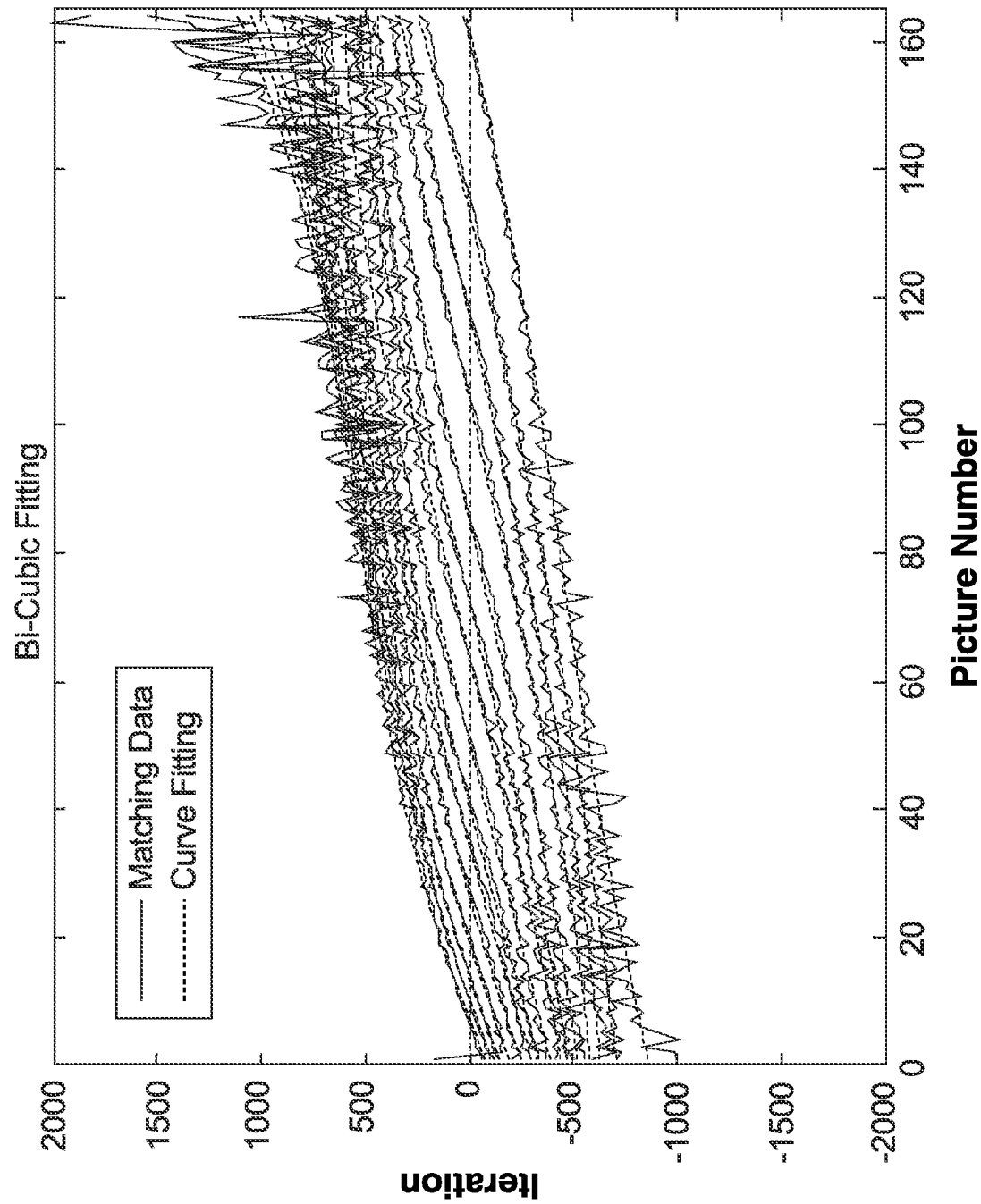
FIG. 10 is a graph of a matching curve showing the use of bi-cubic fitting according to an aspect of the present invention.

FIG. 10 depicts a bi-cubic fitting curve shown in the dashed lines in comparison with the matching data shown in solid lines. It will be seen that this bi-cubic polynomial provides a slightly closer match than that the bi-quadratic fit shown in FIG. 9.

4. Depth Estimation.

With the model presented by Eq. 5, the depth estimation method is readily implemented. First, two images at different focal positions are captured, with distance between the focus positions being within one depth of field. It will be noted that the subject distance is not known at this moment, as it is what is being estimated. The two pictures used in the process can be captured at any distances as long as the difference between the focus positions of these two pictures is one depth of field. Optionally, noise processing, such as histogram matching, may be performed on the captured image information prior to determination of blur difference. The blur difference between the captured images is calculated in regards to Eqs. 2-4, and Eq. (5) becomes a single variable polynomial equation. The polynomial equation is solved for D, which results in generating an estimated depth of the object, also referred to as subject-distance. It should be noted that D can be configured in any desired format, such as an integer or floating point number. For auto focus applications, the lens can be moved to focus at the estimated distance D, and estimate the new depth in the same manner. The procedure may be repeated until the iteration number converges to 0, or below some desired threshold. It should be appreciated that this algorithm may be extended to higher dimensional polynomial models for varying focal lengths and apertures.

5. General Descriptions of Method and Apparatus.

Figure 11:
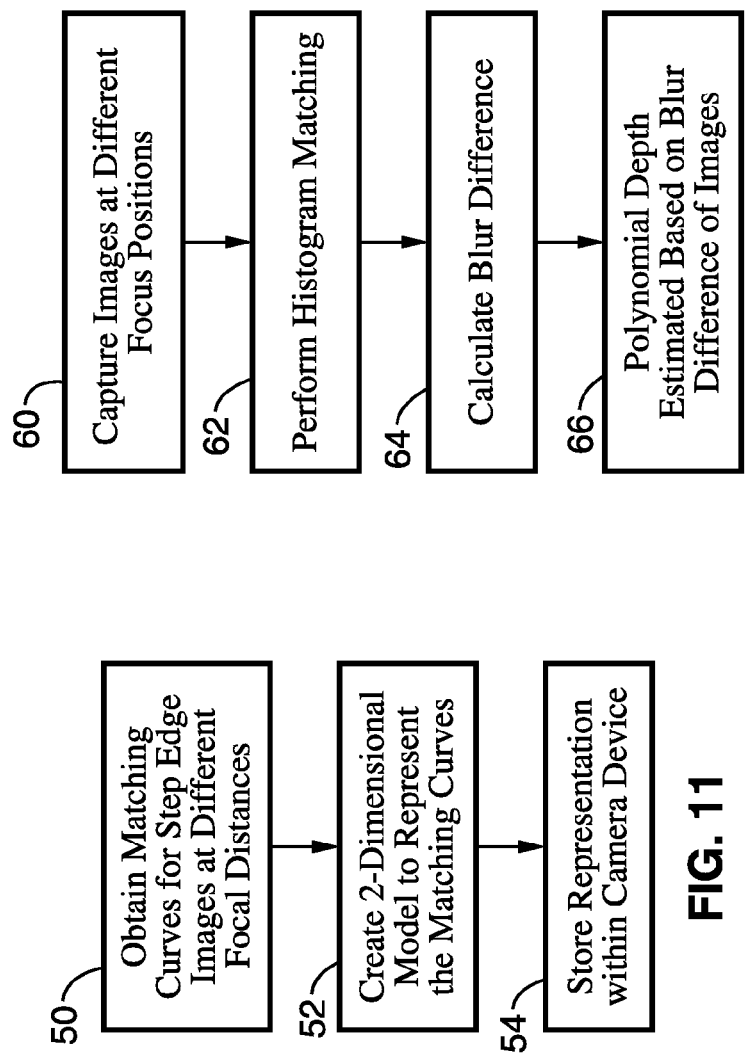
FIG. 11 is a flowchart of calibration according to an aspect of the present invention.

FIG. 11 illustrates a calibration embodiment, such as would be performed by the manufacturer of a given imaging device, such as a camera. In block 50 matching curves are obtained for step-edge images at different focal lengths. A two-dimensional model is then created as per block 52 to represent the matching curves, by way of example as a multi-dimensional polynomial model. After this calibration process the representation of the model, such as its polynomial coefficients, are stored 54, for instance encoded into the non-volatile program memory of the camera device.

Figure 12:
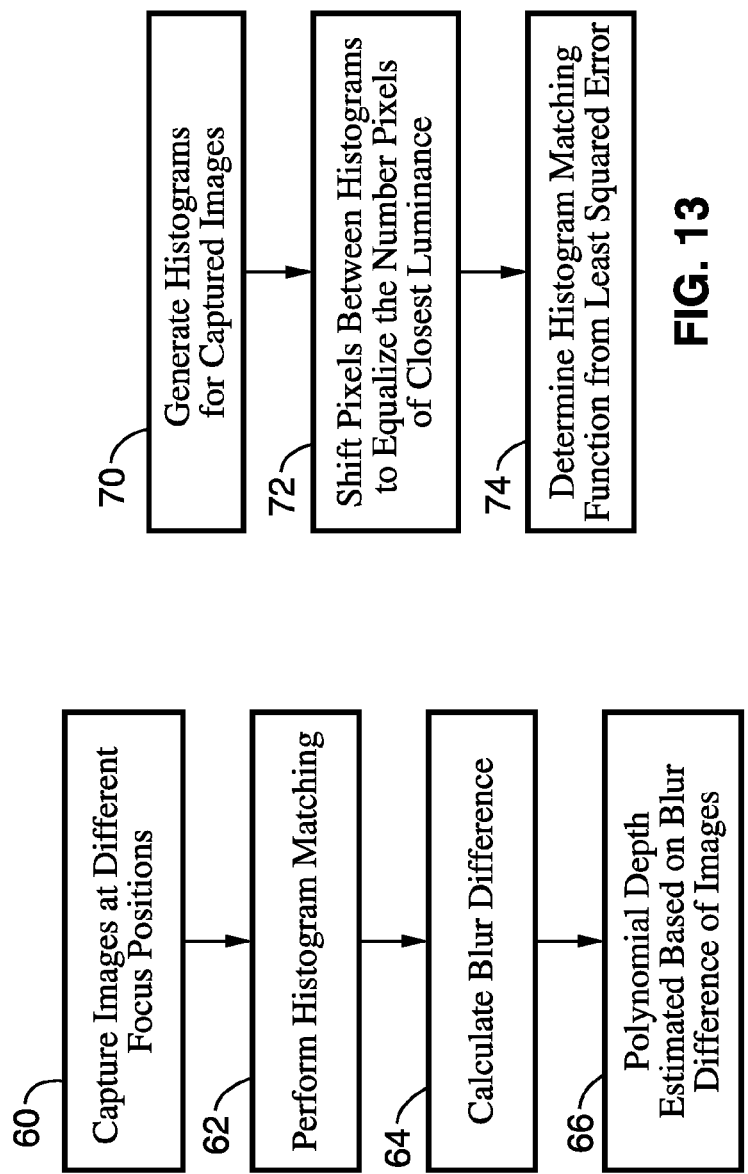
FIG. 12 is a flowchart of camera depth estimation based on two picture matching according to an aspect of the present invention.

FIG. 12 illustrates an embodiment of using the multi-dimensional polynomial model for depth estimation within a camera device according to the present invention. After the calibration process (FIG. 11), the model is thus available for estimating object depth within the specific camera device. Represented in block 60, two images are captured (e.g., pictures taken) at two different focus positions. Histogram matching is preferably performed on the images as per block 62. Blur difference is then calculated in block 64. After this the polynomial model is used in block 66 to estimate the depth based on the blur difference and the focus positions at which the two images were captured.

It should be appreciated that a series of depth estimations may be performed according to the present invention. For example if the method is utilized in concert with camera focus adjustment, then as the camera focus is adjusted, additional image input may be collected and the distance estimation process performed again (or continuously) to provide increasing accuracy as the camera nears proper focus when subject-distance estimates match up with the actual subject-distance.

In order to simplify the focus matching model and to smooth the response, it is desirable to eliminate errors arising from changes in physical camera aspects (e.g., aperture variation, optical element power and temperature variation, mechanical lens setting fluctuations, and the like) and environmental factors (i.e., lighting, motion, temperature, position and so forth). Although the histogram matching process removed some noise source prior to determining blur difference, there is still a measure of noise which can be eliminated, such as was seen in FIG. 7. Toward removing additional noise the focus matching model itself determined in response to the calibration process is preferably cast into a sufficiently smooth mathematical representation (function), for example by adopting a polynomial function of a desired degree (e.g., 2, 3 or 4 degrees) which can be used for depth estimation. Thus, a function (e.g., polynomial function) is selected to substitute for the model created based on the empirically collected data. The substitute function of course must provide sufficient curve matching (fit) with the empirical data in order that use of the model will render sufficiently accurate distance estimations.

For example, given a lens position and an iteration number, a two-dimensional polynomial equation becomes a single variable equation. Aspects of the invention describe examples of the single variable equation as a quadratic or cubic equation, which can be solved in one step. It should also be appreciated that the algorithm can be extended to higher dimensional polynomial functions as desired, for example for use with different focal lengths and apertures.

Figure 13:
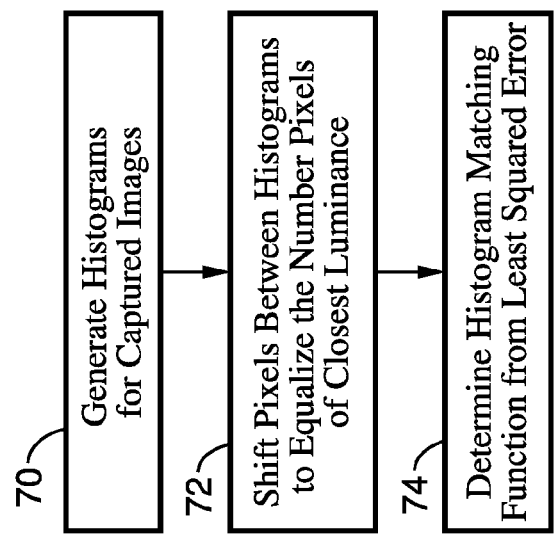
FIG. 13 is a flowchart of histogram matching according to an aspect of the present invention.

FIG. 13 illustrates the histogram matching process which is preferably performed, as seen in block 62 of FIG. 12, to remove noise prior to computing blur difference. As represented in block 70, histograms are generated for two pictures obtained at different focus positions. Pixels are sequentially shifted from one histogram to equalize the number of pixels of the closest luminance of the other histogram as per block 72. A histogram matching function is determined using a least squared error solution as represented in block 74. It should be recognized that a one dimensional linear functions preferably selected for this histogram matching function, by virtue of its simplicity. It should be recognized that the histogram matching function and the focus matching function are different and distinct, the latter being a two dimensional polynomial function.

Figure 14:
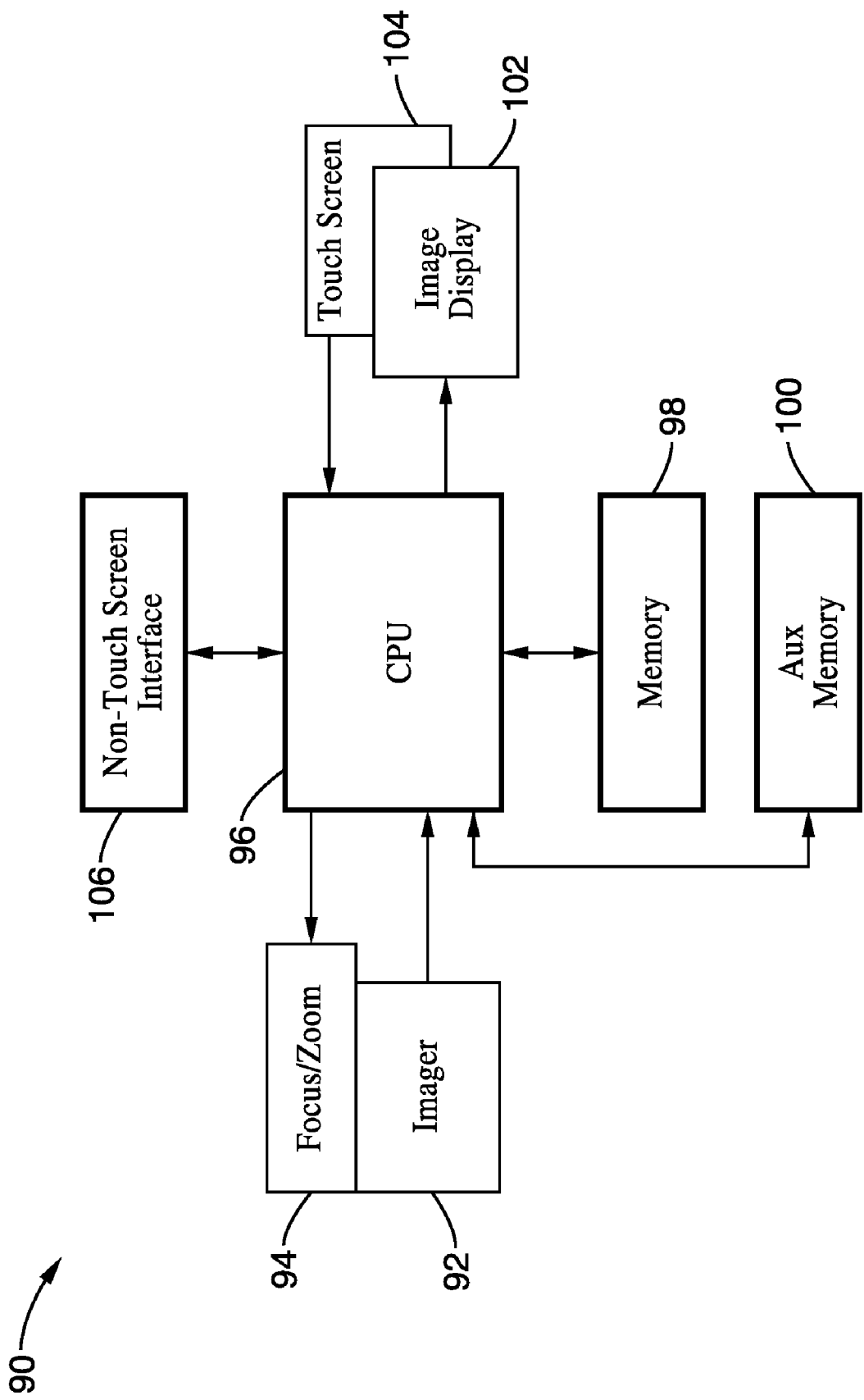
FIG. 14 is a block diagram of an image capture apparatus configured for performing depth estimation according to an aspect of the present invention.

FIG. 14 illustrates an example embodiment 90 of an image capture device (camera) 90 configured for depth estimation according to the invention. A focus/zoom control 94 is shown coupled to imaging optics 92 as controlled by a computer (CPU) 96. Computer 96 performs the depth estimation method in response to instructions executed from memory 98 and/or auxiliary memory 100. Shown by way of example for a camera device (e.g., video or still) are an image display 102, touch screen 104, and non-touch screen interface 106. However, it will be appreciated that the method according to the present invention can be implemented on various image capture devices which are configured with focus control, focus indicators, or combinations thereof. It should be appreciated that the calibration process (e.g., FIG. 11) which generates the model, such as defined by polynomial coefficients, is performed by a computer controlled test setup. By contrast to which the depth estimation and focusing control should be implemented in the camera as depicted in FIG. 14, or a similar imaging device.

In regards to the use of a zoom control or other means of changing the lens focal length, also referred to as magnification, it should be appreciated that the camera and/or lens system in use will be preferably characterized according to the present invention across its applicable zoom range. For example, characterization of the camera and/or lens will be performed as described for each discrete focal length of lens setting in a camera having discrete lens selections, or at incremental steps along the zoom range of a camera having a continuously selectable zoom control. In this way the estimation of distance to a subject can be performed for single focal length lenses, as described, or for those having multiple ranges whether continuous ranges (e.g., zoom) or discontinuous which is more typically referred to as discrete ranges (e.g., normal/macro setting or other selectable range settings). In a prior section the extension of the 2-dimensional polynomial model to higher dimensions has been described which provides for various focal lengths (different zoom positions) and apertures. By way of example and not limitation, Eq. (5) can be rewritten as I=F(L,D,Z,A) where Z is focal length, and A is the aperture to provide a four-dimensional polynomial model.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for electronically capturing images, comprising:
   an imaging device;
   a focus control element coupled to the imaging device;
   a computer processor coupled to the imaging device and the focus control element;
   memory coupled to the computer processor and configured for retaining images captured from the imaging device and for retaining programming executable by the computer processor;
   a multi-dimensional focus matching model retained in the memory, wherein the model is based on imaging calibration targets at different focal lengths; and
   programming executable by the computer processor for carrying out the steps of,
   (i) capturing multiple object images,
   (ii) automatically adjusting the focus control element in response to performing depth estimation on the object images based on inputting blur differences detected between the images into the focus matching model, and
   performing histogram matching for processing the object images to reduce noise from outliers between focal positions prior to inputting the blur differences into the focus matching model.

2. An apparatus as recited in claim 1, wherein the imaging device comprises a still image camera, a video image camera, or a combination still and video image camera.

3. An apparatus as recited in claim 1, wherein said focus matching model utilizes a polynomial function to reduce mismatching noise.

4. An apparatus as recited in claim 3, wherein coefficients of the polynomial function are stored in the memory.

5. An apparatus as recited in claim 1, wherein the focus matching model is generated by performing a calibration process comprising:
   obtaining a series of calibration target images for registering proper focus;
   obtaining focus curves for the series of calibration target images; and
   generating the multi-dimensional model based on matching the focus curves for the series of calibration target images.

6. An apparatus as recited in claim 5:
   wherein the calibration process includes a histogram matching process for reducing mismatching between successive focal positions when obtaining the series of calibration target images, said histogram matching process comprising:
   sequentially shifting pixels from a first histogram to a second histogram to equalize the pixels of closest luminance; and
   approximating the histogram match utilizing a linear matching function;
   wherein noise effects are reduced which have been introduced into the model in response to undesired physical and environmental variations.

7. An apparatus for estimating focal distance from a camera to an object, comprising:
   a computer processor configured for operation in connection with an imaging device of a camera;
   memory coupled to the computer processor and configured for retaining images of an object captured from the imaging device and for retaining programming executable by the computer processor;

a multi-dimensional focus matching model retained in the memory, wherein the model is based on imaging calibration targets at different focal lengths; and programming executable by the computer processor for automatically estimating proper focal distance in response to performing depth estimation comprising, (i) capturing multiple object images;

(ii) histogram matching process to remove mismatching between successive focal positions so that distance can be more accurately determined based on more accurate blur differences;

(iii) determining blur differences between the multiple object images; and (iv) entering the blur differences into the focus matching model to generate an estimate of focal distance to the object.

8. An apparatus as recited in claim 7, wherein the apparatus is incorporated into a still image camera, a video image camera, or a combination still and video image camera.

9. An apparatus as recited in claim 7, wherein the focus matching model is based on blur differences determined in response to contrast changes detected as camera to calibration target distance changes through at least a portion of the focal range of the camera.

10. An apparatus as recited in claim 9, wherein the focal distances at which images are captured and the amount of blur difference between the images are modeled within the focus matching model.

11. An apparatus as recited in claim 7, wherein the focus matching model is utilizes a polynomial function to reduce mismatching noise.

12. An apparatus as recited in claim 5, wherein the focus matching model further includes focus matching information for different focal length settings of a multi-focal length lens system.

13. A method of automatic estimation of camera-to-object focal depth, comprising:

generating a multi-dimensional focus matching model in response to detecting blur differences between multiple images of a calibration subject captured at different focal distances;

capturing multiple object images;

histogram matching of the multiple object images for reducing the noise associated with outliers between focal positions;

determining blur differences between the multiple object images; and estimating focal depth in response to entering the blur differences between the multiple object images into the focus matching model to generate an estimate of focal distance to the object.

14. A method as recited in claim 13, wherein said method is performed associated with a still image camera, a video image camera, or a combination still and video image camera.

15. A method as recited in claim 14, wherein said determining blur differences is performed in response to detecting contrast difference changes as distance between object and camera changes.

16. A method as recited in claim 13, further comprising utilizing a polynomial function in the focus matching model to reduce mismatching noise.

17. A non-transitory computer-readable media containing a computer program executable on a computer which is configured for automatically estimating camera focal depth of an object in response to the steps, comprising:

storing a focus matching model created in response to blur difference information generated about a calibration target at different focal distances;

capturing images for at least two different focal positions;

performing histogram matching for processing the object images to reduce noise from outliers between focal positions prior to inputting of blur differences into the focus matching model;

calculating blur difference between the captured images; and estimating depth of the object in response to inputting the blur difference between the captured images into the focus matching model and solving the model to generate an estimation of distance to the object.

18. An apparatus for electronically capturing images, comprising:

an imaging device;

a focus control element coupled to the imaging device;

a computer processor coupled to the imaging device and the focus control element;

memory coupled to the computer processor and configured for retaining images captured from the imaging device and for retaining programming executable by the computer processor;

a multi-dimensional focus matching model retained in the memory, wherein the model is based on imaging calibration targets at different focal lengths;

wherein said focus matching model is generated by performing a calibration process comprising (i) obtaining a series of calibration target images for registering proper focus, (ii) obtaining focus curves for the series of calibration target images, and (iii) generating the multi-dimensional model based on matching the focus curves for the series of calibration target images;

wherein said calibration process includes a histogram matching process for reducing mismatching between successive focal positions when obtaining the series of calibration target images, said histogram matching process comprising (iv) sequentially shifting pixels from a first histogram to a second histogram to equalize the pixels of closest luminance; (v) approximating the histogram match utilizing a linear matching function; and (vi) wherein noise effects are reduced which have been introduced into the model in response to undesired physical and environmental variations; and programming executable by the computer processor for carrying out the steps of, (vii) capturing multiple object images; and (viii) automatically adjusting the focus control element in response to performing depth estimation on the object images based on inputting blur differences detected between the images into the focus matching model.

19. An apparatus as recited in claim 18, wherein the imaging device comprises a still image camera, a video image camera, or a combination still and video image camera.

20. An apparatus as recited in claim 18, wherein said focus matching model utilizes a polynomial function to reduce mismatching noise.

* * * * *